United States Patent
Tan et al.

(10) Patent No.: US 10,128,044 B2
(45) Date of Patent: Nov. 13, 2018

(54) FILM CAPACITOR AND THE METHOD OF FORMING THE SAME

(71) Applicant: General Electric Company, Schenectady, NY (US)

(72) Inventors: Daniel Qi Tan, Rexford, NY (US); Lili Zhang, Niskayuna, NY (US); Joseph Lucian Smolenski, Slingerlands, NY (US); Jeffrey S Sullivan, Rexford, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 174 days.

(21) Appl. No.: 14/943,433

(22) Filed: Nov. 17, 2015

(65) Prior Publication Data
US 2017/0140875 A1    May 18, 2017

(51) Int. Cl.
| | |
|---|---|
| *H01G 4/33* | (2006.01) |
| *H01G 4/005* | (2006.01) |
| *H01G 4/28* | (2006.01) |
| *H01G 4/32* | (2006.01) |
| *H01G 2/08* | (2006.01) |
| *H01G 4/258* | (2006.01) |

(52) U.S. Cl.
CPC ............. *H01G 4/005* (2013.01); *H01G 2/08* (2013.01); *H01G 4/258* (2013.01); *H01G 4/28* (2013.01); *H01G 4/32* (2013.01); *H01G 4/33* (2013.01)

(58) Field of Classification Search
CPC ............ H01G 4/32; H01G 4/35; H01G 9/028; H01G 9/042; H01G 9/008; H01G 4/005; H01G 3/33
See application file for complete search history.

(56) References Cited

U.S. PATENT DOCUMENTS

| | | | |
|---|---|---|---|
| 4,536,819 | A | 8/1985 | Deutsch |
| 4,719,539 | A | 1/1988 | Lavene |
| 7,471,498 | B2 | 12/2008 | Lavene et al. |
| 7,471,499 | B2 | 12/2008 | Bond |
| 7,864,506 | B2 * | 1/2011 | Pal ........................ H01G 2/08 361/303 |
| 8,451,133 | B2 | 5/2013 | Lavene et al. |

(Continued)

FOREIGN PATENT DOCUMENTS

| | | |
|---|---|---|
| CN | 203300448 U | 11/2013 |
| CN | 203871184 U | 10/2014 |

(Continued)

*Primary Examiner* — Nguyen Ha
(74) *Attorney, Agent, or Firm* — GE Global Patent Operation; Nitin Joshi (57) ABSTRACT

A film capacitor is presented. The film capacitor includes a thermally conductive support. The thermally conductive support includes a core including a first end and a second end. The thermally conductive support further includes a protrusion extending from at least one of the first end and the second end of the core, where at least one of the core and the protrusion includes a phase change material. Further, the film capacitor also includes a plurality of films disposed on at least a portion of the thermally conductive support, where the plurality of films includes a plurality of electrode films and a dielectric film. Further, the thermally conductive support for the film capacitor and a method of forming the film capacitor are also presented.

20 Claims, 9 Drawing Sheets

(56) References Cited

U.S. PATENT DOCUMENTS

| | | | | |
|---|---|---|---|---|
| 2003/0117763 | A1* | 6/2003 | Connolly | H01G 4/232 |
| | | | | 361/301.5 |
| 2006/0156521 | A1* | 7/2006 | Miura | H01G 9/008 |
| | | | | 29/25.03 |
| 2008/0310075 | A1* | 12/2008 | Takeoka | H01G 4/01 |
| | | | | 361/301.5 |
| 2010/0312761 | A1* | 12/2010 | Yuen | G06F 17/30265 |
| | | | | 707/706 |
| 2010/0315761 | A1* | 12/2010 | Georgopoulos | H01G 4/224 |
| | | | | 361/327 |
| 2013/0194712 | A1* | 8/2013 | Lavene | H01G 4/32 |
| | | | | 361/274.1 |
| 2014/0016244 | A1* | 1/2014 | Monno | C08J 5/18 |
| | | | | 361/323 |
| 2014/0301018 | A1 | 10/2014 | Ichinose et al. | |

FOREIGN PATENT DOCUMENTS

| | | |
|---|---|---|
| WO | 2008040114 A1 | 4/2008 |
| WO | 2014117862 A1 | 8/2014 |

* cited by examiner

FILM CAPACITOR AND THE METHOD OF FORMING THE SAME

STATEMENT REGARDING FEDERALLY SPONSORED RESEARCH AND DEVELOPMENT

This invention was made with Government support under contract number DE-EE0006433 awarded by the U.S. Department of Energy. The Government has certain rights in the invention.

BACKGROUND

Embodiments of the disclosure relate to capacitors. More particularly, embodiments of the disclosure relate to a film capacitor having a thermally conductive support and a method of forming the film capacitor.

Capacitors, such as, film capacitors, are often found in numerous electronic circuits. In some applications, these capacitors are subject to increased temperatures caused due to an external environment, ripple current pulses, or both. For example, some commercially available capacitors that are capable of handling higher voltage ratings (for example, 250 Volts DC to 1000 Volts DC) may suffer from low temperature ratings and difficulty in heat removal. For a given ambient condition, an internal temperature of a capacitor may increase by a few hundred degrees Celsius, depending on the ripple current being handled by a capacitor. For example, a polypropylene capacitor in a DC-biased ripple filter application, experiences approximately a 30° C. rise at 35 average root means square (ARMS) Ampere current with an AC sinusoidal source of 5 kHz voltage applied across the capacitor at room temperature.

Sometimes, exposure to such steep temperature rise degrades performance of the capacitors. In certain cases, the capacitor may fail to operate and may even burn down, thereby leading to a hazardous situation.

Various external cooling systems are currently used to maintain the capacitor and an inverter/converter system at safe temperature range. Such cooling systems may not only add considerable complexity, but may also increase system volume, weight, and cost. Continued reliance on such cooling systems to overcome the low temperature limitations of the current commercial capacitors may not meet the increasing demand for smaller, lighter, and high-power electrical systems.

Therefore, there exists a need for an improved capacitor that may be maintained at lower temperatures while working in one or both of a high temperature and a higher ripple current environment.

BRIEF DESCRIPTION

One embodiment is directed to a film capacitor. The film includes a thermally conductive support. The thermally conductive support includes a core having a first end and a second end. The thermally conductive support further includes a protrusion extending from at least one of the first end and the second end of the core, wherein at least one of the core and the protrusion includes a phase change material. Further, the film capacitor also includes a plurality of films disposed on at least a portion of the thermally conductive support, wherein the plurality of films includes plurality of electrode films and a dielectric film.

Another embodiment is directed to a thermally conductive support for a film capacitor. The thermally conductive support includes a core having a first end and a second end. The thermally conductive support further includes a protrusion extending from at least one of the first end and the second end of the core, wherein at least one of the core and the protrusion includes a phase change material.

Yet another embodiment is directed to a method. The method includes forming a film capacitor. The film capacitor includes a thermally conductive support. The thermally conductive support includes a core having a first end and a second end. The thermally conductive support further includes a protrusion extending from at least one of the first end and the second end of the core, wherein at least one of the core and the protrusion includes a phase change material. Further, the film capacitor also includes a plurality of films disposed on at least a portion of the thermally conductive support, wherein the plurality of films includes plurality of electrode films and a dielectric film.

DRAWINGS

These and other features, aspects, and advantages of the present specification will become better understood when the following detailed description is read with reference to the accompanying drawings in which like characters represent like parts throughout the drawings, wherein.

DETAILED DESCRIPTION

The specification may be best understood with reference to the detailed figures and description set forth herein. Various embodiments are described hereinafter with reference to the figures. However, those skilled in the art will readily appreciate that the detailed description given herein with respect to these figures is for explanatory purposes as the method and the system may extend beyond the described embodiments.

Unless defined otherwise, technical and scientific terms used herein have the same meaning as is commonly understood by one of ordinary skill in the art to which this disclosure belongs. In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. Here and throughout the specification and claims, range limitations may be combined and/or interchanged; such ranges are identified and include all the sub-ranges contained therein unless context or language indicates otherwise.

Some embodiments are directed to a film capacitor and a thermally conductive support for the film capacitor. The film capacitor includes a thermally conductive support. The thermally conductive support includes a core having a first end and a second end. The thermally conductive support further includes a protrusion extending from at least one of the first end and the second end of the core, wherein at least one of the core and the protrusion includes a phase change material. Further, the film capacitor also includes a plurality of films disposed on at least a portion of the thermally conductive support, wherein the plurality of films includes plurality of electrode films and a dielectric film. Further, some embodiments are also directed to a method for forming the film capacitor.

Figure 1A:
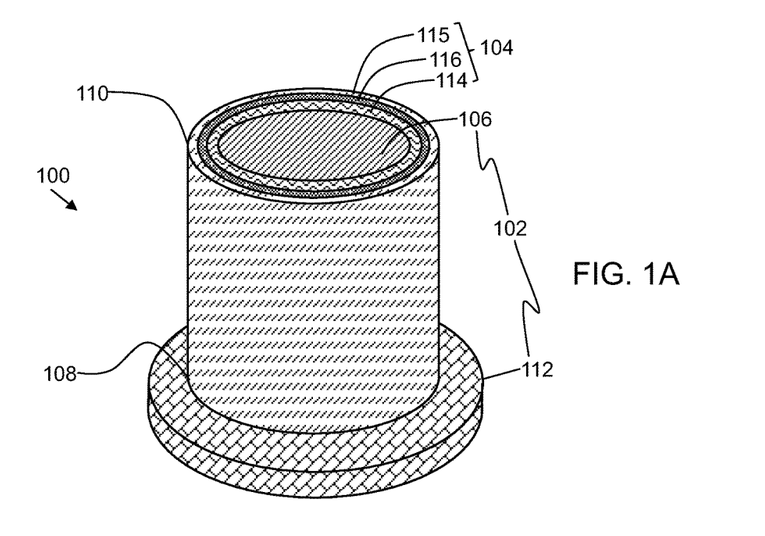
FIGS. 1A and 1B represent a diagrammatical illustration of a film capacitor, in accordance with one embodiment.
Figure 1B:
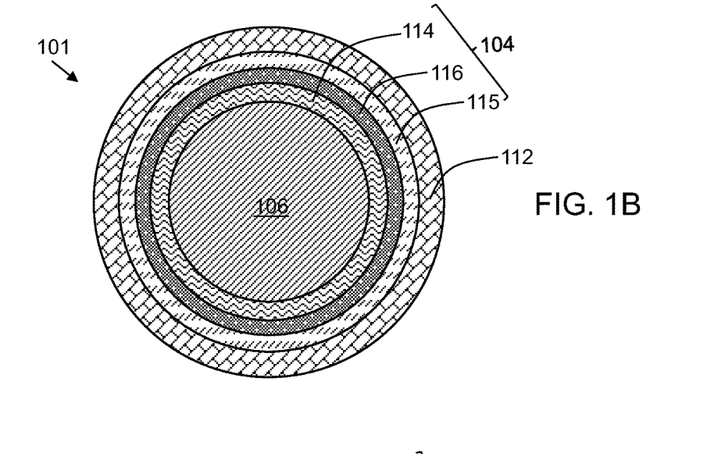

FIGS. 1A and 1B represent a diagrammatical illustration of a film capacitor 100, in accordance with one embodiment. FIG. 1A represents perspective view while FIG. 1B represents a top view of the film capacitor 100. As depicted in FIGS. 1A and 1B, in some embodiments, the film capacitor 100 may include a thermally conductive support 102. The film capacitor 100 may further include a plurality of films 104 (described later) disposed on at least a portion of the thermally conductive support 102. A non-limiting example of the film capacitor 100 may include a wound film capacitor.

The thermally conductive support 102 may include a core 106 having a first end 108 and a second end 110. In some embodiments, the thermally conductive support 102 may also include a protrusion 112 extending from at least one of the first end 108 and the second end 110 of the core 106.

In some embodiments, at least one of the core 106 and the protrusion 112 includes a phase change material. The term phase change material as used herein refers to a material capable of melting and solidifying at a certain temperature and is capable of storing and releasing thermal energy. Typically, the phase change material absorbs or releases thermal energy when the phase change material changes its state from solid to liquid and vice versa. Non-limiting examples of the phase change material may include solders such as, but not limited to, InSn-based Indalloy 1E (capable of melting at temperatures of about 117° C.), InAg-based Indalloy 164 (capable of melting at temperatures of about 154° C.), InPb-based Indalloy 204 (capable of melting at temperatures of about 175° C.), and BiSn-based Indalloy 281 (capable of melting at temperatures of about 138° C.) that are commercialized by Indium Corporation®. Further, other non-limiting examples of the phase change material may include organic material-based phase change materials such as, but not limited to, savE® HS89 (capable of melting at temperatures of about 89° C.) from Pluss®, PureTemp® 151 (capable of melting at temperatures of about 151° C.) from PureTemp®, Paraffin 33-Carbon (capable of melting at temperatures of about 75.9° C.), and hydrated salt-based PlusICE including A118 (capable of melting at temperatures of about 118° C.) and A164 (capable of melting at temperatures of about 164° C.).

Without being bound by any theory it is believed that during an operation of the film capacitor 100, a ripple current flowing through the film capacitor 100 may cause a rise in the temperature thereof. Such transient (for example, the increase) in the temperature of the film capacitor 100 may be addressed by the phase change material. For example, the phase change material may be capable of storing and releasing such thermal energy. The thermal energy may be absorbed or released when the phase change material changes from solid to liquid and vice versa, for example.

Moreover, in some embodiments, at least one of the core 106 and the protrusion 112 further includes one or more thermally conductive materials. Non-limiting examples of such thermally conductive materials may include aluminum, copper, iron, boron nitride, aluminum nitride, silicon nitride, silicon carbide, oxide ceramic, or combinations thereof. Non-limiting examples of the oxide ceramic may include aluminum oxide ($Al_2O_3$), beryllium oxide (BeO), magnesium oxide (MgO), titanium oxide ($TiO_2$), cubic spinel ($MgAl_2O_4$), quartz ($SiO_2$), strontium aluminate ($SrAl_2O_4$), strontium titanate ($SrTiO_3$), non-oxide diamond, or combinations thereof. The thermally conductive support 102 is further described in conjunction with FIGS. 2-9, in accordance with some embodiments.

Figure 2:
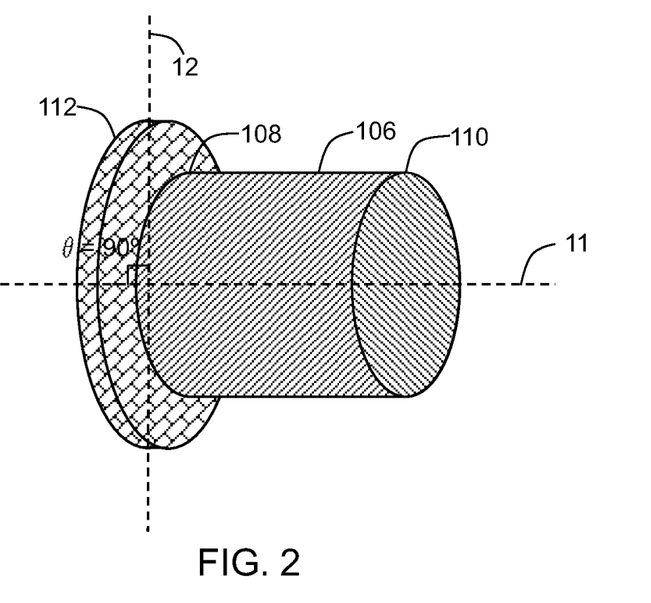
FIG. 2 is a diagrammatical illustration of a thermally conductive support, in accordance with one embodiment.
Figure 3:
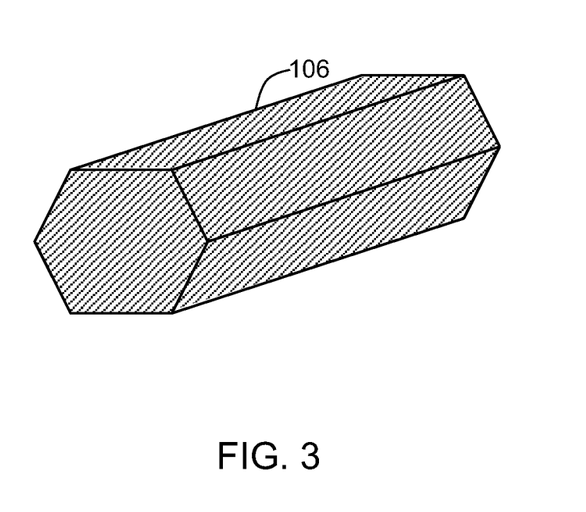
FIG. 3 is a diagrammatical illustration of a core of a thermally conductive support, in accordance with one embodiment.

FIG. 2 is a diagrammatical illustration of the thermally conductive support 102, in accordance with one embodiment. As depicted in FIG. 2, in some embodiments, at least one of the core 106 and the protrusion 112 may be solid. For example, as depicted in FIG. 2, the core 106 may be a solid cylinder. However, a solid core of other shapes is also envisioned, without limiting the scope of the present specification. In some embodiments, as depicted in FIGS. 2 and 3, the core 106 is characterized by a first axis 11 and the protrusion 112 is characterized by a second axis 12. FIG. 3 is a diagrammatical illustration of a core of a thermally conductive support, in accordance with one embodiment. In a non-limiting example, FIG. 3 depicts a solid core 106 having a polygonal shape, for example. Although, the core 106 of FIG. 3 is shown as having hexagonal cross section, a core having any type of polygonal cross section, including but not limited to, square, rectangular, triangular, pentagonal, and the like, is also envisioned.

Figure 4:
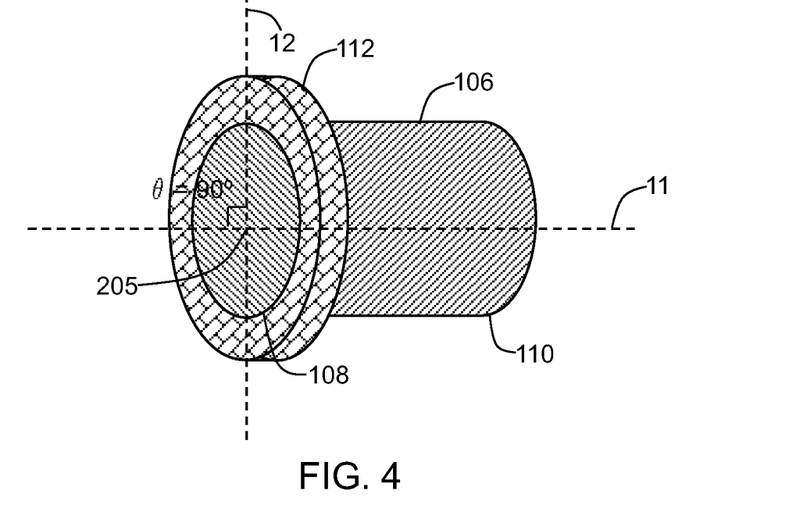
FIG. 4 is a diagrammatical illustration of a thermally conductive support, in accordance with another embodiment.

In some embodiments, the protrusion 112 includes a disc or a ring. For example, in the embodiments as illustrated in FIGS. 1 and 2, the protrusion 112 is shown as the disc extending from the first end 108 of the core 106. In some embodiments, the protrusion 112 of varying shapes may be employed without limiting the scope of the present specification (for example, see FIGS. 4 and 5). FIG. 4 is a diagrammatical illustration of the thermally conductive support 102, in accordance with another embodiment. In particular, FIG. 4 depicts the thermally conductive support 102 including the protrusion 112 that is ring-shaped.

In some embodiments (for example, as illustrated in FIGS. 3 and 4), the protrusion 112 (shaped as a ring or a disc) is substantially concentric with the core. The term "substantially concentric" as used herein refers to a configuration of the core 106 and the protrusion 112 where a perpendicular distance between an axis 11 of the core 106 (hereinafter referred to as a first axis 11) and the center 205 of the protrusion 112 is within 10% of the radius of the core 106. In one embodiment, the core 106 and the protrusion 112 are configured such that the perpendicular between the first axis 11 and the center 205 of the protrusion 112 is within 10% of the radius of the protrusion 112.

Figure 5:
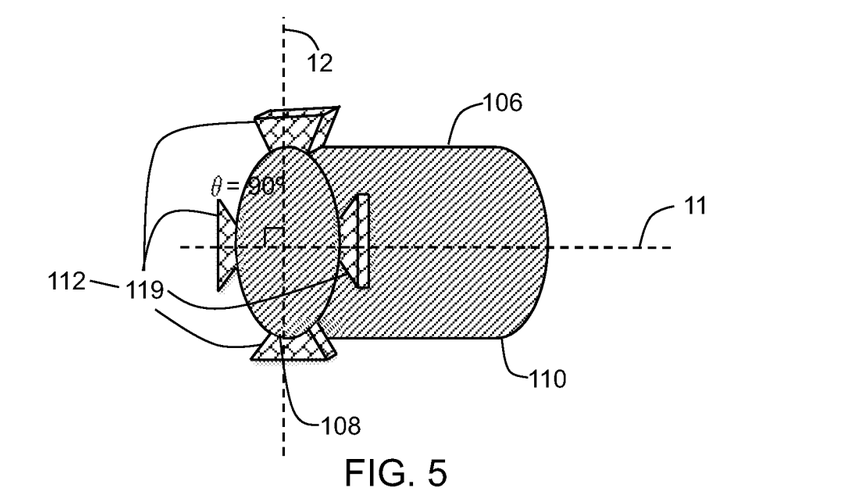
FIG. 5 is a diagrammatical illustration of a thermally conductive support, in accordance with another embodiment.

FIG. 5 is a diagrammatical illustration of the thermally conductive support 102, in accordance with another embodiment. FIG. 5, in one embodiment, depicts the thermally conductive support 102 having a segmented protrusion 117. The segmented protrusion 117 may include a plurality of segments 119. The segments 119 may be disposed at a uniform or non-uniform distance from each other without limiting the scope of the present specification.

Referring to again to FIG. 2, in some embodiments, an angle (θ) between the first axis 11 (i.e., an axis of the core 106) and the second axis 12 (i.e., an axis of the protrusion 112) is in a range from about 80 to 110 degrees. In the embodiment illustrated in FIG. 2, the angle (θ) between the first axis 11 and the second axis 12 is substantially 90 (ninety) degrees. In one embodiment, the term "substantially 90 degrees" as used herein refers to an angle in a range from about 80 degrees to about 110 degrees.

Figure 6:
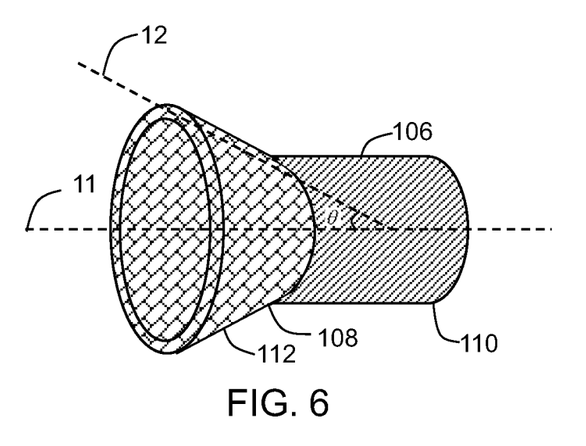
FIG. 6 is a diagrammatical illustration of a thermally conductive support, in accordance with another embodiment.
Figure 7:
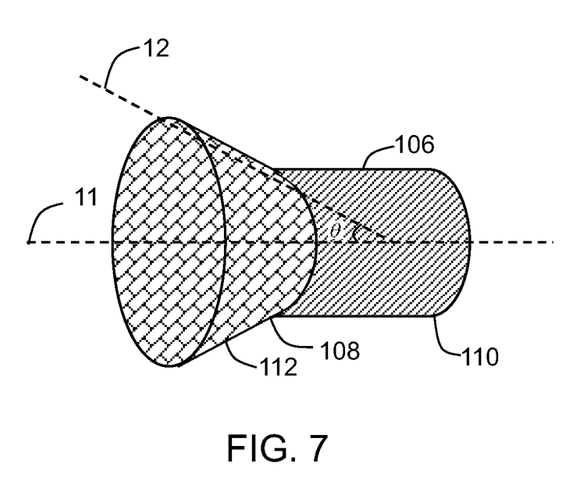
FIG. 7 is a diagrammatical illustration of a thermally conductive support, in accordance with another embodiment.

However, in other embodiments, the angle (θ) the between the first axis 11 and the second axis 12 may be greater or lower than 90 degrees (for example, see FIG. 6). FIG. 6 is a diagrammatical illustration of the thermally conductive support 102, in accordance with another embodiment. As depicted in FIG. 6, the protrusion 112, for example having a truncated cone shape, is formed at the first end 108. In one embodiment, the protrusion 112 is formed such that the angle (θ) between the first axis 11 and the second axis 12 is lower than 90 degrees. For example, in FIG. 6, the dimension of the truncated cone is selected such that the angle (θ) between the wall of the cone and the first axis 11 is lower than 90 degrees. In FIG. 6, the protrusion 112 is shown as having the truncated cone shape, which is hollow. In some embodiments, the protrusion 112 may be solid (for example, see FIG. 7). FIG. 7 is a diagrammatical illustration of the thermally conductive support 102, in accordance with another embodiment. As depicted in FIG. 7, the protrusion 112, for example a solid truncated cone, is formed at the first end 108.

Figure 8:
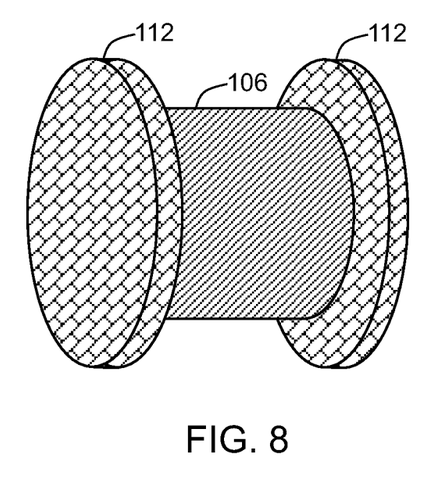
FIG. 8 is a diagrammatical illustration of a thermally conductive support, in accordance with another embodiment.

Further, in FIGS. 1 and 3-7, the protrusion 112 is shown as extending from the first end 108 of the core 106. However, in some embodiments, the protrusion 112 may further extend from the second end 110 of the core 106. In some embodiments, the protrusion 112 may extend from both the first end 108 and the second end 110 (for example, see FIG. 8). FIG. 8 is a diagrammatical illustration of the thermally conductive support 102, in accordance with another embodiment. More particularly, in the thermally conductive support 102 of FIG. 8, the protrusions 112 shaped as discs extend from both the first end 108 and the second end 110.

Figure 9:
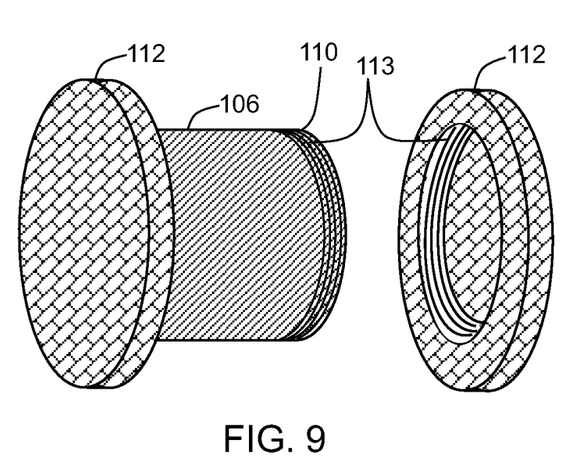
FIG. 9 is a diagrammatical illustration of a thermally conductive support, in accordance with another embodiment.

In some embodiments, the protrusions 112 may be removably coupled to the core 106 at one or both of the first end 108 and the second end 110, for example, via threads (see FIG. 9). FIG. 9 is a diagrammatical illustration of the thermally conductive support 102, in accordance with another embodiment. In a non-limiting example, threads 113 may be formed on the core 106 at the second end 110. Similarly, the threads 113 may also be formed on the protrusion 112, as depicted in FIG. 9, which may be used for coupling the protrusion 112 to the core 106 at the second end 110. Although not depicted, in some alternate embodiments, the threads 113 may be formed at the first end 108 and the corresponding protrusion 112. Also, in some embodiments, the threads 113 may be formed at both the first and second ends 108 and 110, and the corresponding protrusions 112. Although not depicted in FIG. 9, other means and techniques including, but not limited to, soldering, brazing, gluing, fastening using nut and bolt mechanism, and the like, may be employed to couple the protrusion(s) 112 to the core 106.

Figure 10:
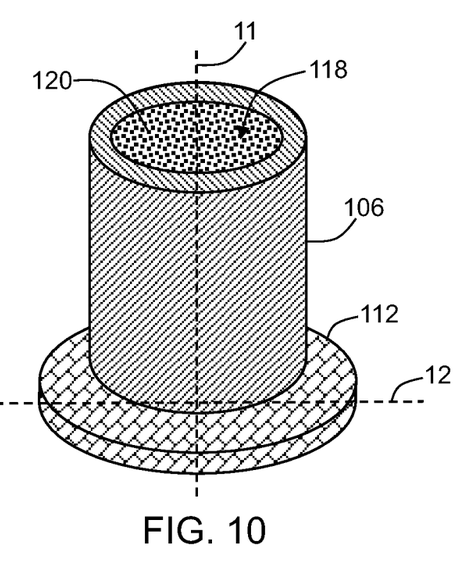
FIG. 10 is a diagrammatical illustration of a thermally conductive support, in accordance with another embodiment.

Furthermore, in some embodiments, at least one of the core 106 and the protrusion 112 of the thermally conductive support 102 may be hollow. In a non-limiting example, the core 106 may include a cavity (for example, see FIG. 10). FIG. 10 is a diagrammatical illustration of the thermally conductive support 102, in accordance with another embodiment. As illustrated in FIG. 10, in some embodiments, the core 106 may have a cavity 118. In some embodiments, the cavity 118 may extend along the first axis 11. Moreover, in certain embodiments, the protrusion 112 may also include a cavity (not shown in FIG. 10). In some such instances, a phase change material 120 may be disposed in one or both of the cavity 118 and the cavity of the protrusion 112.

Figure 11:
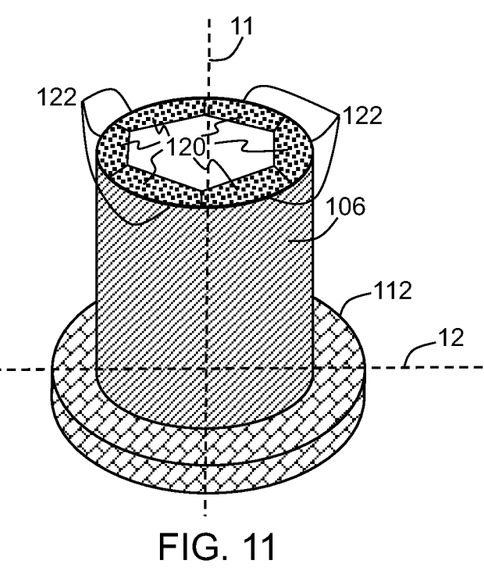
FIG. 11 is a diagrammatical illustration of a thermally conductive support, in accordance with yet another embodiment.

In some embodiments, the core 106 may include one or more walls (see FIG. 11). FIG. 11 is a diagrammatical illustration of a thermally conductive support 102, in accordance with another embodiment. As depicted in FIG. 11, in some embodiments, the core 106 may be hollow and includes one or more walls 122. For example, the core 106 of FIG. 11 may have 6 (six) walls 122. In some embodiments, at least one wall 122 of the one or more walls 122 may be hollow and include the phase change material 120. In the non-limiting configuration depicted in FIG. 11, the core 106 includes walls 122, where all of the walls 122 are hollow and may further include the phase change material 120. Advantageously, in some embodiments, the core 106 having an internal polygonal shape may aid in securely holding the thermally conductive support 102 while forming the film capacitor 100.

Referring again to FIGS. 1A and 1B, as previously noted, the film capacitor 100 may include the plurality of films 104 disposed on at least a portion of the thermally conductive support 102. For ease of illustration, in FIGS. 1A and 1B, a single layer of the plurality of films 104 is depicted. However, in some embodiments, more than one layer of the plurality of films 104 may also be disposed on at least a portion of the thermally conductive support 102. In certain embodiments, one or more turns of a layer containing the plurality of films 104 may be wound on at least a portion of the thermally conductive support 102.

In one embodiment, the plurality of films 104 may be disposed on the core 106. In another embodiment, the plurality of films 104 may be disposed on the core 106 and on at least a portion of the protrusion 112. More particularly, in certain embodiments, the plurality of films 104 are disposed on at least a portion of the thermally conductive support 102 such that the plurality of films 104 is substantially electrically insulated from the thermally conductive support 102. In one embodiment, the film capacitor 100 may include an electrical insulating material (not shown) disposed in thermal contact between the plurality of films 104 and the thermally conductive support 102.

In some embodiments, as depicted in a top view 101 (FIG. 1B) of the film capacitor 100 at the second end 110, the plurality of films 104 may include a plurality of electrode films 114, 115 and a dielectric film 116. The plurality of electrode films 114, 115 may include an anode film and a cathode film. The plurality of electrode films 114, 115 and the dielectric film 116 may be disposed on the thermally conductive support 102 such that the dielectric film 116 is positioned between the two electrode films 114 and 115, and in thermal contact with the thermally conductive support 102. More particularly, in certain embodiments, the plurality of films 104 is wound on at least a portion of the thermally conductive support 102.

Advantageously, in some embodiments, during an operation of the film capacitor 100, the thermally conductive support 102 may receive heat from the plurality of films 104, and dissipate the heat via the protrusion 112.

Figure 12A:
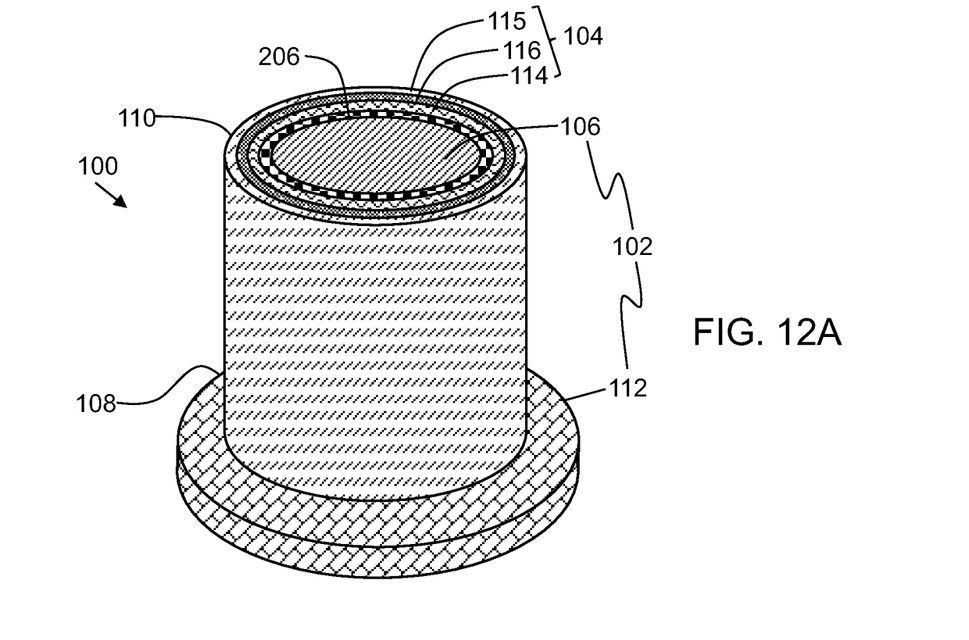
FIGS. 12A and 12B represent a diagrammatical illustration of a film capacitor, in accordance with another embodiment.
Figure 12B:
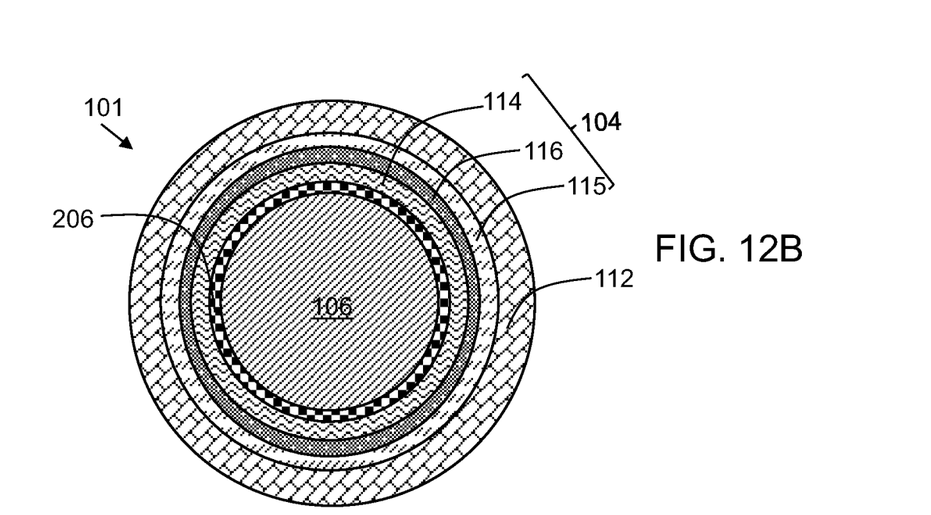

FIGS. 12A and 12B represent a diagrammatical illustration of the film capacitor 100, in accordance with another embodiment. As illustrated in FIGS. 12A and 12B, the film capacitor 100 may additionally include a hollow base core 206 (shown using a checker pattern). As depicted in a top view 101 of the film capacitor 100, the hollow base core 206 may be interposed between the plurality of films 104 and the thermally conductive support 102. The plurality of films 104 may be disposed on at least a portion of the hollow base core 206. In some embodiments, the thermally conductive support is 102 disposed within at least a portion of the hollow base core 206. As shown in the embodiment depicted in FIGS. 12A and 12B, the core 106 is disposed within a cavity of the hollow base core 206.

Figure 13:
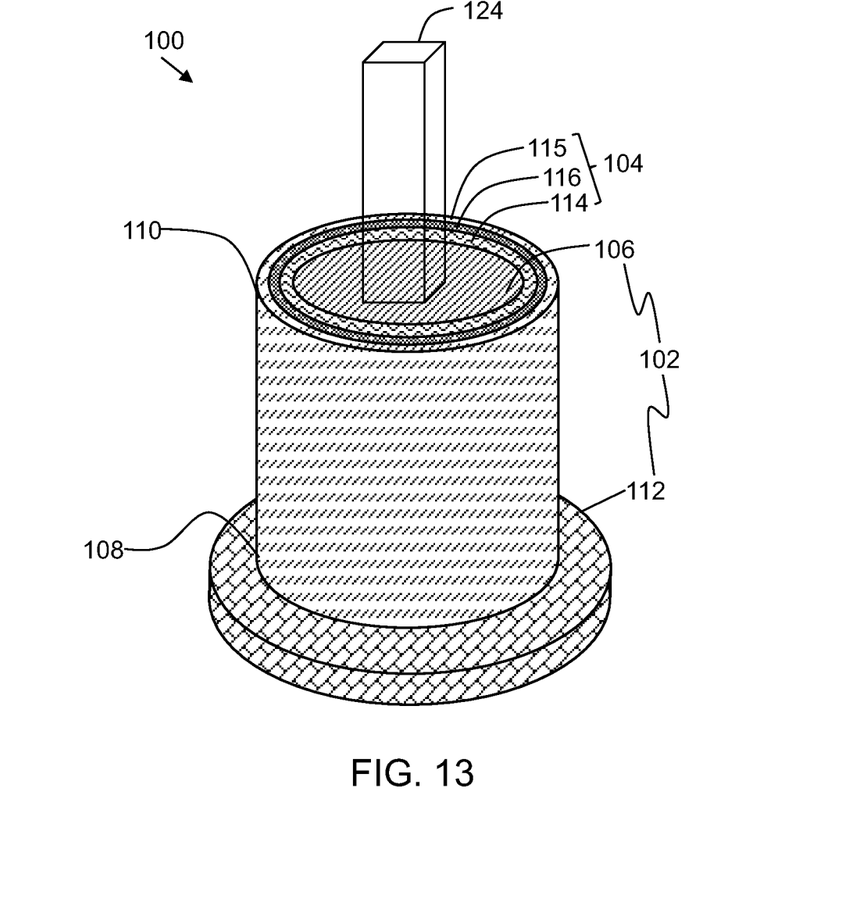
FIG. 13 is a diagrammatical illustration of a film capacitor, in accordance with another embodiment.

FIG. 13 is a diagrammatical illustration of the film capacitor 100, in accordance with yet another embodiment. As illustrated in FIG. 13, the film capacitor 100 may additionally include a heat pipe 124. The heat pipe 124 may be disposed in thermal contact with at least a portion of the thermally conductive support 102 of the film capacitor 100. In the embodiment of FIG. 13, the heat pipe 124 is shown to be disposed in thermal contact with the core 106. However, without limiting the scope of the present specification, the heat pipe 124 may be disposed in thermal contact with one or both of the core 106 and the protrusion 112. In certain embodiments, the heat pipe 124 may be embedded in the thermally conductive support 102. In certain embodiments, the heat pipe 124 may be embedded in the thermally conductive support 102 such that that at least a portion of the heat pipe 124 is disposed outside of the thermally conductive support 102. Additionally, in some embodiments, the film capacitor 100 may further include a heat sink (not shown), where the heat pipe 124 may be thermally coupled to the heat sink. In some embodiments, the heat sink may conduct the heat away from the heat pipe, thereby cooling the film capacitor 100.

Figure 14:
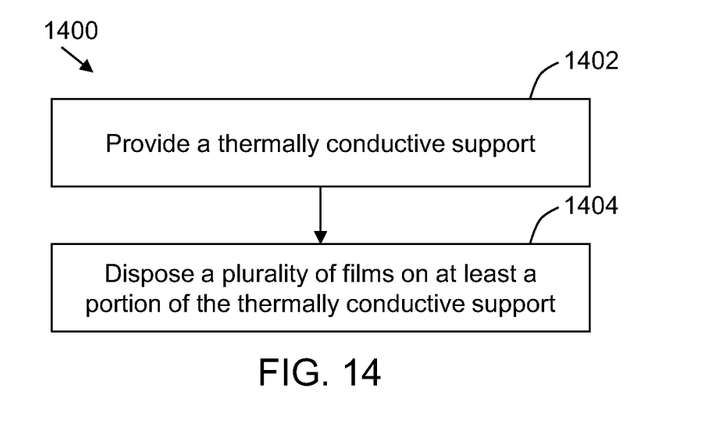
FIG. 14 depicts a flowchart illustrating a method for forming a film capacitor, in accordance with one embodiment.

As mentioned earlier, a method of making a film capacitor (such as film capacitor 100) is also presented. The method includes a step of forming the film capacitor 100. The step of forming a film capacitor 100 is described in further details in conjunction with methods of FIGS. 14 and 15. FIG. 14 depicts a flowchart illustrating a method 1400 for forming the film capacitor 100, in accordance with one embodiment. In some embodiments, the method 1400, at step 1402, may include providing the thermally conductive support 102. The term "providing" as used herein refers to obtaining a pre-fabricated thermally conductive support 102, obtaining pre-fabricating components (such as the core and protrusion) and assembling them together, or fabricating the thermally conductive support 102. In some embodiments, the step of providing the thermally conductive support 102 may include a step of forming the thermally conductive support 102. The thermally conductive support 102 may be formed from a thermally conductive material by shaping the thermally conductive material to achieve the desired shape. In certain embodiments, to form the thermally conductive support 102, a core such as the core 106 may be formed by shaping the thermally conductive material to achieve a desired shape (for example, a solid or hollow cylinder). Thereafter, the protrusion 112 may be formed by shaping the thermally conductive material to achieve a desired shape (for example, a disk, a ring, or segments) of the protrusion 112. Subsequently, the protrusion 112 may be disposed in thermal contact with the core 106 and joined together. In some embodiments, disposing the protrusion 112 in thermal contact with the core 106 may include attaching the protrusion 112 to the core 106 via screwing (for example, see FIG. 9), soldering, brazing, gluing, or fastening using nut and bolt mechanism. In an alternative embodiment, the thermally conductive support 102 may be formed as a monolithic structure of the core 106 and the protrusion 112, for example, by casting the thermally conductive material in a desired shape of the thermally conductive support 102. At least one of the core 106 and the protrusion 112 may be hollow. For example, at least one of the core 106 and the protrusion 112 may have one or more cavities, in some embodiments.

In some embodiments, forming the thermally conductive support 102 may include disposing a phase change material such as the phase change material 120 within a portion of at least one of the hollow core 106 and the hollow protrusion 112 (see FIGS. 10 and 11). For example, the phase change material 120 may be disposed within the one or more cavities formed in one or both of the core 106 and the protrusion 112. In some embodiments, one or both of the core 106 and the protrusion 112 may be formed using the phase change material. In some other embodiments, the one or both of the core 106 and the protrusion 112 may include the phase change material combined with one or more thermally conductive materials.

Once the thermally conductive support 102 is provided, the method 1400 may include disposing the plurality of films 104 on at least a portion of the thermally conductive support 102, at step 1404. In one embodiment, the plurality of films 104 may be disposed on at least a portion of the core 106. In another embodiment, the plurality of films 104 may be disposed on at least a portion of the core 106 and at least a portion of the protrusion 112. More particularly, in certain embodiments, the plurality of films 104 are disposed on at least a portion of the thermally conductive support 102 such that the plurality of films 104 is substantially in thermal contact with the thermally conductive support 102, while being electrically insulated from the thermally conductive support 102. In some embodiments, to facilitate electrical insulation between the plurality of films 104 and the thermally conductive support 102, the method 1400 may also include disposing an electrically insulating material in thermal contact with the thermally conductive support 102 prior to disposing the plurality of films 104 on the thermally conductive support 102.

Figure 15:
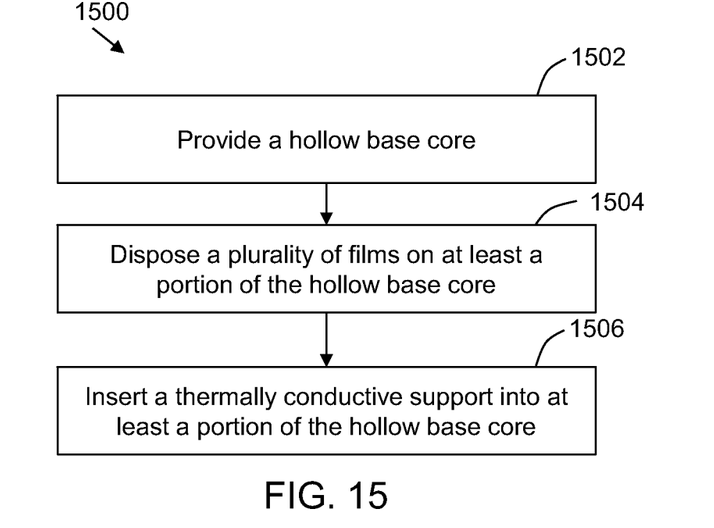
FIG. 15 depicts a flowchart illustrating a method for forming a film capacitor, in accordance with another embodiment.

FIG. 15 depicts a flowchart illustrating a method 1500 for forming a film capacitor 100, in accordance with another embodiment.

In some embodiments, the method 1500 includes providing a hollow base core such as the hollow base core 206 (see FIGS. 12A and 12B), at step 1502. Thereafter, the method 1500, at step 1504, includes disposing the plurality of films 104 on at least a portion of the hollow base core 206. In some embodiments, the plurality of films 104 are wound on at least a portion of the hollow base core 206. The plurality of films 104 may be wound on at least a portion of the hollow base core 206 such that the plurality of films 104 is substantially in thermal contact with the hollow base core 206, while being electrically insulated from the hollow base core 206.

Moreover, the method 1500 includes inserting the thermally conductive support 102 within at least a portion of the hollow base core 206, at step 1506. For example, the thermally conductive support 102 may be inserted into the hollow base core 206 such that a portion of an inner surface or the entire inner surface of the hollow base core 206 is in thermal contact with the thermally conductive support 102.

Additionally, the methods 1400 and 1500, in some embodiments, may also include forming one or more electrodes. An electrode of the one or more electrodes may be electrically coupled to one of the plurality of electrode films. In one embodiment, to aid in the formation of the one or more electrodes, the plurality of films may be disposed at step 1404 on the thermally conductive support 102 such that the thermally conductive support 102 may be removable while forming the electrodes. In some embodiments, to aid in the formation of the one or more electrodes, the thermally conductive support 102 may be inserted at step 1506 within at least a portion of the hollow base core 206 such that the thermally conductive support 102 may be removable while forming the electrodes.

Advantageously, the film capacitor 100, in accordance with some embodiments, is capable of maintaining reduced internal temperature. Such reduced internal temperature may be attained at least partially due to the thermally conductive support 102 according to some embodiments. For example, in certain embodiments, use of the phase change material 120 in the thermally conductive support 102 may help reduce the temperature of the film capacitor 100 by storing the thermal energy caused by temperature transients. In addition, steady state heat generation in the film capacitor 100 may be addressed by the thermally conductive material of the thermally conductive support 102. Operation of the film capacitor 100 at such reduced temperatures may avoid deterioration of the performance of the film capacitor 100. Therefore, chances of occurring hazardous situations may be greatly reduced.

The present disclosure has been described in terms of some specific embodiments. They are intended for illustration only, and should not be construed as being limiting in any way. Thus, it should be understood that modifications can be made thereto, which are within the scope of the disclosure and the appended claims.

It will be appreciated that variants of the above disclosed and other features and functions, or alternatives thereof, may be combined to create many other different systems or applications. Different implementations of the systems and methods may perform some or all of the steps described herein in different orders, parallel, or substantially concurrently. Various unanticipated alternatives, modifications, variations, or improvements therein may be subsequently made by those skilled in the art and are also intended to be encompassed by the following claims.

The invention claimed is:

1. A film capacitor, comprising:
a thermally conductive support comprising:
a core comprising a first end and a second end, and
a protrusion extending from at least one of the first end and the second end of the core, wherein at least one of the core and the protrusion comprises a phase change material; and
a plurality of films disposed on at least a portion of the thermally conductive support, wherein the plurality of films comprises a plurality of electrode films and a dielectric film.

2. The film capacitor of claim 1, wherein the core is characterized by a first axis and the protrusion is characterized by a second axis, and an angle between the first axis and the second axis is in a range from about 80 to 110 degrees.

3. The film capacitor of claim 2, wherein the angle between the first axis and the second axis is substantially 90 degrees.

4. The film capacitor of claim 1, wherein the protrusion comprises a disc or a ring, which is substantially concentric with the core.

5. The film capacitor of claim 1, wherein at least one of the core and the protrusion is solid.

6. The film capacitor of claim 1, wherein at least one of the core and the protrusion is hollow.

7. The film capacitor of claim 1, wherein at least one of the core and the protrusion comprises aluminum, copper, iron, boron nitride, aluminum nitride, silicon nitride, silicon carbide, oxide ceramic, or combinations thereof.

8. The film capacitor of claim 1, wherein the film capacitor is a wound film capacitor.

9. The film capacitor of claim 1, wherein the core comprises one or more walls, and wherein at least one wall of the one or more walls is hollow and comprises the phase change material.

10. The film capacitor of claim 1, further comprising a hollow base core interposed between the plurality of films and the thermally conductive support, wherein the plurality of films is disposed on at least a portion of the hollow base core and the thermally conductive support is disposed within at least a portion of the hollow base core.

11. The film capacitor of claim 1, further comprising a heat pipe, wherein at least a portion of the heat pipe is disposed in thermal contact with at least a portion of the thermally conductive support.

12. A thermally conductive support for a film capacitor, comprising:
a core comprising a first end and a second end; and
a protrusion extending from at least one of the first end and the second end of the core, wherein at least one of the core and the protrusion comprises a phase change material.

13. The thermally conductive support of claim 12, wherein the core is characterized by a first axis and the protrusion is characterized by a second axis, and an angle between the first axis and the second axis is in a range from about 80 to 110 degrees.

14. The thermally conductive support of claim 12, wherein the protrusion comprises a disc or a ring, which is substantially concentric with the core.

15. The thermally conductive support of claim 12, wherein the core comprises one or more walls, and wherein at least one wall of the one or more walls is hollow and comprises the phase change material.

16. A method, comprising:

forming a film capacitor, wherein the film capacitor comprises:

a thermally conductive support comprising:

a core comprising a first end and a second end, and a protrusion extending from at least one of the first end and the second end of the core, and wherein at least one of the core and the protrusion comprises a phase change material; and a plurality of films disposed on at least a portion of the thermally conductive support, wherein the plurality of films comprises a plurality of electrode films and a dielectric film.

17. The method of claim 16, wherein the step of forming a film capacitor comprises:

providing the thermally conductive support; and disposing the plurality of films on at least a portion of the thermally conductive support.

18. The method of claim 16, wherein the step of forming a film capacitor comprises:

disposing the plurality of films on at least a portion of a hollow base core; and inserting the thermally conductive support into at least a portion of the hollow base core.

19. The method of claim 16, further comprising forming the thermally conductive support comprising at least one of a hollow core and a hollow protrusion.

20. The method of claim 19, wherein forming the thermally conductive support further comprises disposing the phase change material within a portion of at least one of the hollow core and the hollow protrusion.

* * * * *